(12) United States Patent
Ghiya (10) Patent No.: US 10,430,197 B2
(45) Date of Patent: Oct. 1, 2019

(54) BANKING REGISTER RENAMING TO REDUCE POWER

(71) Applicant: Samsung Electronics Co., Ltd., Suwon-si, Gyeonggi-do (KR)

(72) Inventor: Ankit Ghiya, Austin, TX (US)

(73) Assignee: SAMSUNG ELECTRONICS CO., LTD. (KR)

( * ) Notice: Subject to any disclaimer, the term of this patent is extended or adjusted under 35 U.S.C. 154(b) by 168 days.

(21) Appl. No.: 15/657,076

(22) Filed: Jul. 21, 2017

(65) Prior Publication Data

US 2018/0329711 A1 Nov. 15, 2018

Related U.S. Application Data

(60) Provisional application No. 62/505,837, filed on May 12, 2017.

(51) Int. Cl.
| | |
|---|---|
| *G06F 9/38* | (2018.01) |
| *G06F 9/30* | (2018.01) |
| *G06F 1/3296* | (2019.01) |
| *G06F 1/3206* | (2019.01) |
| *G06F 1/3234* | (2019.01) |

(52) U.S. Cl.
CPC ............ *G06F 9/384* (2013.01); *G06F 1/3206* (2013.01); *G06F 1/3275* (2013.01); *G06F 1/3296* (2013.01); *G06F 9/30105* (2013.01); *G06F 9/30141* (2013.01); *G06F 9/3836* (2013.01)

(58) Field of Classification Search
CPC ...... G06F 9/384; G06F 9/3017; G06F 9/3836; G06F 9/3853; G06F 1/206; G06F 1/3203; G06F 1/324; G06F 1/3287; G06F 1/3296; G06F 21/34; G06F 21/44; G06F 9/30032; G06F 9/30094; G06F 9/30105; G06F 9/30141; G06F 9/30149; G06F 9/3802; G06F 9/3842; G06F 9/3851; G06F 9/3855; G06F 9/3857; G06F 9/3867; G06F 9/3885; G06F 1/3206; G06F 1/3275

See application file for complete search history.

(56) References Cited

U.S. PATENT DOCUMENTS

| | | | |
|---|---|---|---|
| 5,802,338 | A | 9/1998 | Rechtschaffen et al. |
| 5,815,701 | A | 9/1998 | Slavenburg |
| 6,108,771 | A | 8/2000 | Gaertner et al. |

(Continued)

FOREIGN PATENT DOCUMENTS

JP 2001236222 A 8/2001

*Primary Examiner* — Terrell S Johnson
(74) *Attorney, Agent, or Firm* — Renaissance IP Law Group LLP (57) ABSTRACT

According to one general aspect, an apparatus may include a register circuit and an instruction scheduler circuit. The register circuit may include a plurality of physical registers that are partitioned into at least a common portion that is associated with a predefined plurality of instructions, and a shared portion, and a plurality of write ports, wherein each portion is associated with at least one respective write port. The instruction scheduler circuit configured to determine an instruction, and rename an architectural register associated with the instruction to a physical register. Wherein the portion including the physical register is selected based, at least in part, upon a characteristic of the current instruction.

20 Claims, 5 Drawing Sheets

(56) References Cited

U.S. PATENT DOCUMENTS

| | | |
|---|---|---|
| 6,938,149 B2 | 8/2005 | Kunimatsu et al. |
| 8,438,366 B2 | 5/2013 | Akizuki et al. |
| 2004/0193846 A1* | 9/2004 | Sprangle ............. G06F 9/30141 |
| | | 712/218 |
| 2004/0215988 A1* | 10/2004 | Clabes .................... G06F 1/206 |
| | | 713/300 |
| 2005/0091475 A1* | 4/2005 | Sodani ................ G06F 9/30101 |
| | | 712/217 |
| 2006/0265555 A1* | 11/2006 | Davis ................. G06F 9/30112 |
| | | 711/147 |
| 2012/0005459 A1* | 1/2012 | Fleischman ......... G06F 9/30032 |
| | | 712/216 |
| 2016/0224514 A1 | 8/2016 | Moudgill et al. |

\* cited by examiner

BANKING REGISTER RENAMING TO REDUCE POWER

CROSS-REFERENCE TO RELATED APPLICATION

This application claims priority under 35 U.S.C. § 119 to Provisional Patent Application Ser. No. 62/505,837, entitled "BANKING REGISTER RENAMING TO REDUCE POWER" filed on May 12, 2017. The subject matter of this earlier filed application is hereby incorporated by reference.

TECHNICAL FIELD

The present disclosure generally relates computer processors. In particular, the present disclosure relates to banking register renaming to reduce power.

BACKGROUND

A central processing unit (CPU) includes a plurality of execution units or schedulers. Such schedulers include an address generation unit (AGU), a floating point (FP) unit, a load (LD) unit, a store (ST) unit, and an integer (INT) unit. Each scheduler, after executing the scheduler's operation, writes the scheduler's results in a physical register file (PRF).

In computer architecture, register renaming eliminates false data dependencies arising from reuse of architectural registers by successive instructions that do not have any real data dependencies between them. The elimination of such false data dependencies reveals more instruction-level parallelism in the instruction stream. Excessive write ports on the PRF are required to support parallel write from any scheduler. In an out-of-order system, this creates multiple writers on the PRF. To improve instructions per cycle (IPC), the PRF is growing and more write ports are added at the cost of power consumption.

For example, with 8 schedulers and 256 physical register file entries with a width of 64, for each entry, it is required to decode out of the 8 write ports, which write port to write to that entry (i.e., select between 8 data to write in each location). Thus, a total of 8 write ports and 256 8-1 multiplexer (MUX) for a width of 64 each may be required.

Machine language programs specify reads and writes to a limited set of registers specified by the instruction set architecture (ISA). These are the architectural registers. Programs written for a given instruction set will specify operations that read and write those architectural registers. In standard renaming schemes, the machine converts the architectural registers referenced in the instruction stream into physical registers. These physical registers are then used by the execution units to perform the instruction.

SUMMARY

According to one general aspect, an apparatus may include a register circuit and an instruction scheduler circuit. The register circuit may include a plurality of physical registers that are partitioned into at least a common portion that is associated with a predefined plurality of instructions, and a shared portion, and a plurality of write ports, wherein each portion is associated with at least one respective write port. The instruction scheduler circuit configured to determine an instruction, and rename an architectural register associated with the instruction to a physical register. Wherein the portion including the physical register is selected based, at least in part, upon a characteristic of the current instruction.

According to another general aspect, a method may include determining an instruction. The method may include renaming an architectural register associated with the instruction to a physical register within a register circuit. The register circuit may include a plurality of physical registers that are partitioned into at least a common portion that is associated with a predefined plurality of instructions, and a shared portion. Renaming may include a selected portion of the register circuit based upon the instruction, and selecting a physical register include within the selected portion.

According to another general aspect, a system may include a register circuit and an instruction decode circuit. The register circuit may include a plurality of physical registers that are partitioned into at least a common portion that is associated with a predefined plurality of instructions, and a shared portion. Wherein writing to the common portion composes less power than writing to the shared portion. The instruction decode circuit may be configured to determine an instruction, and rename an architectural register associated with the instruction to a physical register, wherein the portion including the physical register is selected based, at least in part, upon a characteristic of the instruction.

The details of one or more implementations are set forth in the accompanying drawings and the description below. Other features will be apparent from the description and drawings, and from the claims.

A system and/or method for banking register renaming to reduce power, substantially as shown in and/or described in connection with at least one of the figures, as set forth more completely in the claims.

BRIEF DESCRIPTION OF THE DRAWINGS

Like reference symbols in the various drawings indicate like elements.

DETAILED DESCRIPTION

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it may be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, and so on may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

Figure 1:
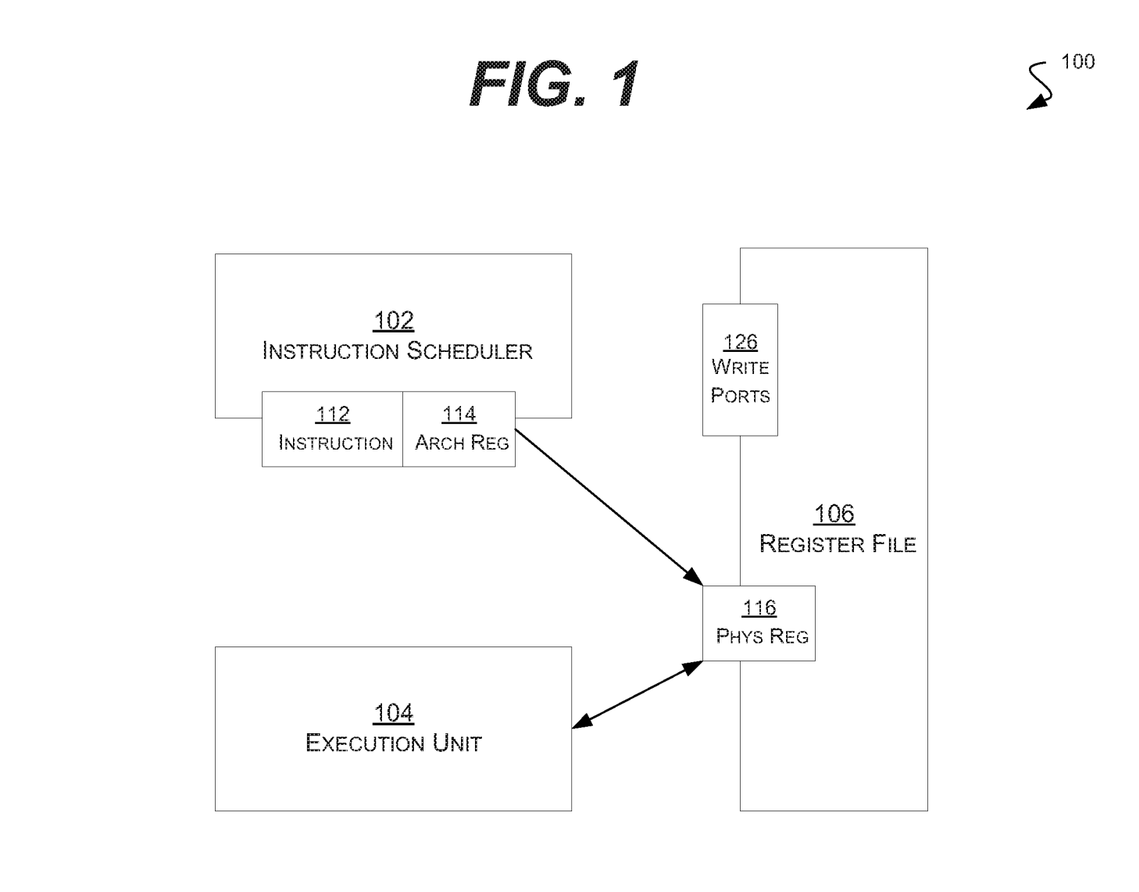
FIG. 1 is a block diagram of an example embodiment of a system in accordance with the disclosed subject matter.

FIG. 1 is a block diagram of an example embodiment of a system 100 in accordance with the disclosed subject matter. In various embodiments, the system 100 may be included in a processor, a system-on-a-chip (SoC), integrated circuit (IC), or other computing device.

In various embodiments, the system 100 includes an execution unit 104 and a scheduler 102. The scheduler 102 and the execution unit 104 may each include an address generation unit (AGU), a floating point (FP) unit, a load (LD) unit, a store (ST) unit (or combined a load-store unit (LSU)), and an integer (INT) unit.

In various embodiments, the scheduler 102 or the execution unit 104 schedules, executes, or processes an instruction 112. Typically, an instruction 112 is associated with an architectural register 114. For example, the instruction 112 loads data (an operand) or writes data (a result) to an architectural register 114. In this context, an architectural register 114 is one defined by the instruction set architecture (ISA). However, because multiple instructions 112 execute simultaneously (e.g., different threads, out-of-order issues), the actual architectural registers 114 are rarely available. Often, in various embodiments, the architectural registers 114 may not physically exist. Instead the system 100 may rely upon register renaming to virtualize the architectural registers.

In the illustrated embodiment, the system 100 may include a bank or series of physical registers 116. These may be grouped into a register file or register circuit 106. In the illustrated embodiment, the scheduler 102 or the execution unit 104 may rename the architectural register 114 to a physical register 116. The instruction 112 may then be executed using the physical register 116 in place of the architectural register 114.

In various embodiments, a register file 106 may include a plurality of write ports 126. The number of simultaneous (or substantially simultaneous) write operations that may be performed to the register file 106 may be limited by the number of write ports 126. Traditionally, each write port 126 may allow writing from any source (e.g., the scheduler 102, the execution unit 104) to any portion of the register file 106 (e.g., to any physical register 116). As a result, each write port must support a large number of inputs and a large number of outputs. This can be very costly in terms of area and circuitry (e.g., power consumption).

Figure 2A:
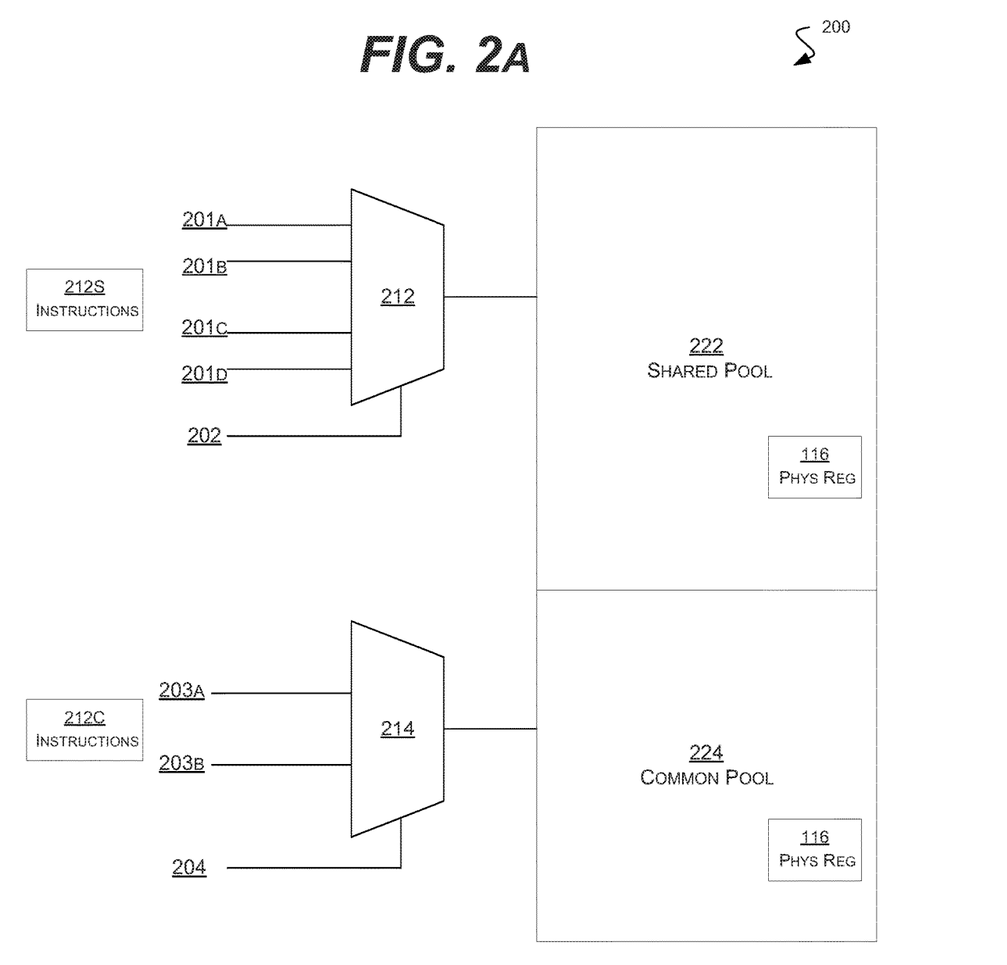
FIG. 2A is a block diagram of an example embodiment of an apparatus in accordance with the disclosed subject matter.

FIG. 2A is a block diagram of an example embodiment of an apparatus 200 in accordance with the disclosed subject matter. In various embodiments, the apparatus 200 may include a register file or circuit, as described above. It is understood that the above is merely one illustrative example to which the disclosed subject matter is not limited.

In various embodiments, the apparatus 200 may be divided or portioned into a shared pool 222 and a common pool 224. In the illustrated embodiment, the shared pool 222 and the common pool 224 may each include their own respective physical registers 116.

In the illustrated embodiment, the shared pool 222 and the common pool 224 may be segregated or divided based upon the instruction or scheduler/execution unit accessing them. In the illustrated embodiment, the common pool 224 may be associated with or accessed by a select few or limited group or set of instructions 212C or scheduler/execution units. Conversely, the shared pool 222 may be accessed by any instruction 212S or scheduler/execution unit. In another embodiment, the shared pool 222 may be accessed or associated with a set of instructions that does not include the common instructions 221C.

For example, in one embodiment, the shared pool 222 of physical registers 116 may be written to from any number of sources (schedulers, execution units). As such the shared pool 222 may be associated or include the greatest number of write ports 201A, 201B, 201C, and 201D provided by the register file 200 (e.g., four write ports). The shared pool 22 may include a selection circuit or multiplexer (MUX) 212 to arbitrate between competing write requests (controlled by signal 202). As described above, the greater the number of write ports, the greater the complexity of the MUX 212.

Continuing the example, the common pool 224 of physical registers 116 may be associated with an ADD and LOAD (LD) instructions 212C. Since the number of sources for writing to the register file 200 is decreased, the number of write ports 203A and 203B may likewise be decreased (e.g., to two write ports). In such an embodiment, the complexity of the selection circuit or multiplexer (MUX) 214 (controlled by signal 204) may be decreased. As such, the power consumption associated with the common pool 224 may be decreased, and the speed of the common pool 224 may be increased. It is understood that the above are merely a few illustrative examples to which the disclosed subject matter is not limited.

In various embodiments, the number of write ports may be determined by the number of schedulers or execution units able to access or associated with the shared pool 222 and the common pool 224. For example, the common pool 224 may only be associated with two schedulers (or instructions) and hence may only have two write ports. Conversely, the shared pool 224 may be associated with many more schedulers and may have more than four write ports. It is understood that the above are merely a few illustrative examples to which the disclosed subject matter is not limited.

In various embodiments, the shared pool 222 may be larger or include more physical registers 116 than the common pool 224. In another embodiment, the size of the shared pool 222 and common pool 224 may be the same (e.g., 40 physical registers 116 each).

In the illustrated embodiment, the scheduler or execution unit may be configured to only rename an architectural register to a physical register 116 of the common pool 224, if the architectural register is associated with an instruction that is included in the predefined plurality of instructions 212C. In such an embodiment, the common instructions 212C may have greater access to the physical registers 116 than the average instruction (e.g., those in instructions 212S).

In the illustrated embodiment, the scheduler or execution unit may be configured to rename an architectural register to a physical register 116 of the shared pool 222, regardless of what instruction is associated with the architectural register. In such an embodiment, the architectural register may be renamed to the shared pool 222 even if it is associated with the common instructions 212C. In another embodiment, the shared pool 222 may be excluded from the common instructions 212C. It is understood that the above are merely a few illustrative examples to which the disclosed subject matter is not limited.

In one embodiment, the scheduler or execution unit may be configured to, if the instruction is a common instruction 212C, attempt to rename the architectural register to the common pool 224. If the scheduler or execution unit is not able to rename the architectural register to the common pool 224 (e.g., the write ports are in use, all the common pool 224 registers 116 are in use), the scheduler or execution unit may rename the architectural register to the shared pool 222. In such an embodiment, the common instructions 212C may have access to the entire register file 200. Whereas, the shared instructions 212S may only have access to the shared pool 222.

In various embodiments, the common instructions 212C may be predefined and statically configured. In another embodiment, the common instructions 212C may be selected and configured as part of the rebooting or restarting of the apparatus 200. In yet another embodiment, the common instructions 212C may be dynamically configurable and may be altered as the type or nature of the instructions executed by the processor or system change. For example, as certain instructions become executed more or less frequently they may be added or removed from the common instructions 212C. It is understood that the above are merely a few illustrative examples to which the disclosed subject matter is not limited.

Figure 2B:
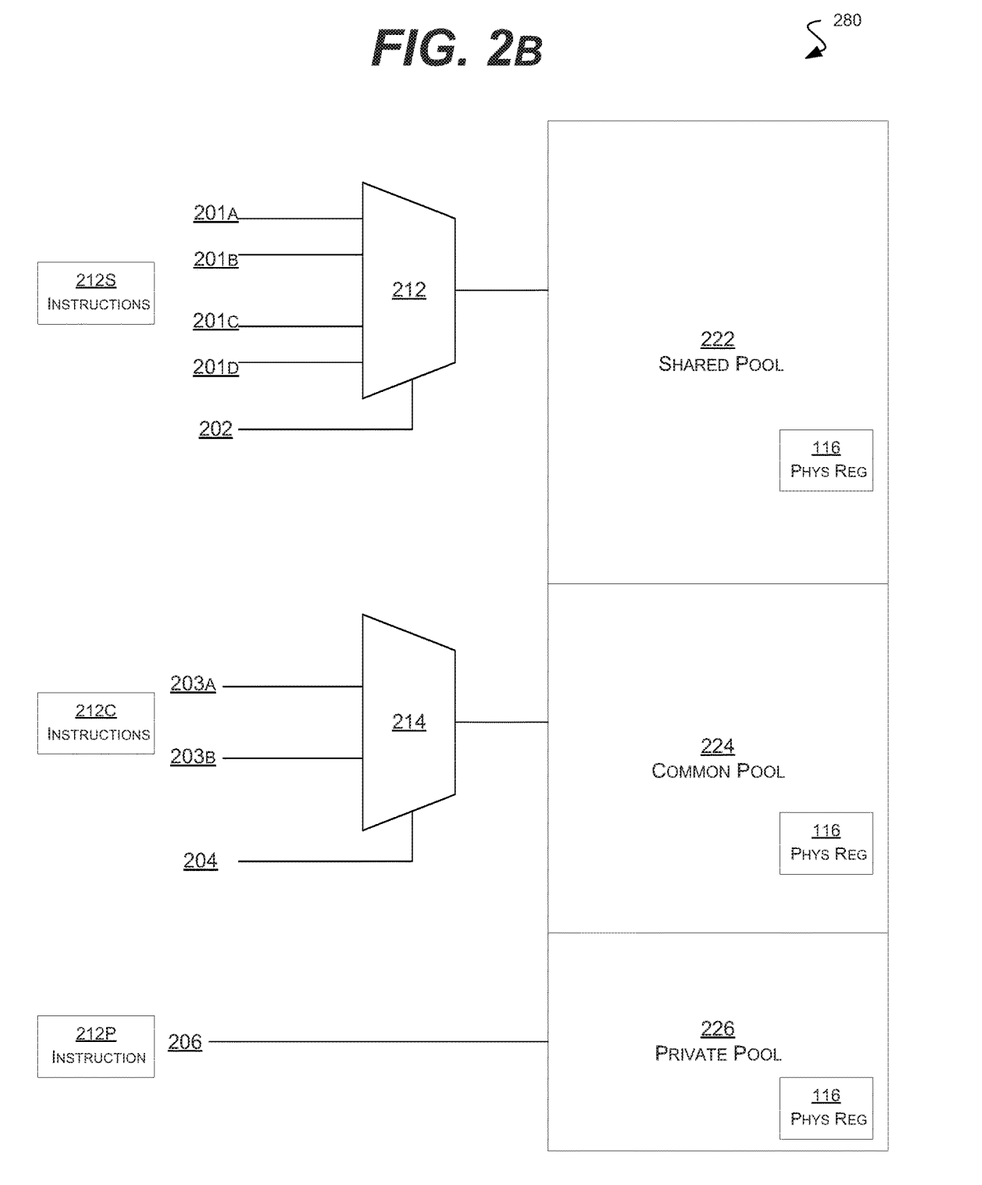
FIG. 2B is a block diagram of an example embodiment of an apparatus in accordance with the disclosed subject matter.

FIG. 2B is a block diagram of an example embodiment of an apparatus 280 in accordance with the disclosed subject matter. In various embodiments, the apparatus 280 may include a register file or circuit, as described above. It is understood that the above is merely one illustrative example to which the disclosed subject matter is not limited.

In the illustrated embodiment, the apparatus or register file 280 may include a shared pool 222 and a common pool 224, each with respective physical registers 116, as described above. As described above, the shared pool 222 may be associated with the shared instructions 212S, the write ports 201A, 201B, 201C & 201D, and the selection circuit 212. The common pool 224 may be associated with the common instructions 212C, the write ports 203A & 203B, and the selection circuit 214. As described above, in various embodiments, the shared pool 222 may be associated with more write ports than the common pool 224. It is understood that the above are merely a few illustrative examples to which the disclosed subject matter is not limited.

In the illustrated embodiment, the register file or apparatus 280 may also be partitioned or portioned into a private pool 226. As described above, the private pool 226 may include a number of physical registers 116. Unlike the shared pool 222 and common pool 224, which are associated with multiple instructions (e.g., instructions 212S and 212C), the private pool 226 may be associated with a single instruction 212P.

In such an embodiment, the scheduler or execution unit may be configured to only rename an architectural register to the private pool 226, if the architectural register is associated with the private instruction 212P. In such an embodiment, the private instruction 212P may have exclusive access to a portion of the register file 280. In one such embodiment, the private instruction 212P may include the ADD instruction or the LOAD instruction; although, it is understood that the above are merely a few illustrative examples to which the disclosed subject matter is not limited.

In such an embodiment, the private pool 226 may be associated with or include an even smaller number of write ports than the common pool 224. In the illustrated embodiment, the private pool 226 may include a single write port 206. In such an embodiment, the write port logic may be very simplified (consuming less power and area, for example) and may not include a selection circuit or MUX. It is understood that the above is merely one illustrative example to which the disclosed subject matter is not limited.

In the illustrated embodiment, if the scheduler or execution unit is not able to rename the architectural register to the private pool (despite the architectural register being associated with the private instruction 212P), it may rename it to the common pool 224 or the shared pool 222 (assuming the private instruction 212P is included in the common instructions 212C). If the private instruction 212P is not included in the common instructions 212C, the scheduler or execution unit may rename the architectural register to the shared pool 222 instead. It is understood that the above are merely a few illustrative examples to which the disclosed subject matter is not limited.

In one specific embodiment, the register file 280 may include 100 physical registers 116. In such an embodiment, the shared pool 22 may include 40 physical registers 116. The common pool may include 40 physical registers 116. And, the private pool 226 may include 20 physical registers 116. In one embodiment, the common instructions 212C may include the ADD and LOAD instructions. The private instruction 212P may include the ADD instruction. It is understood that the above is merely one illustrative example to which the disclosed subject matter is not limited.

Figure 2C:
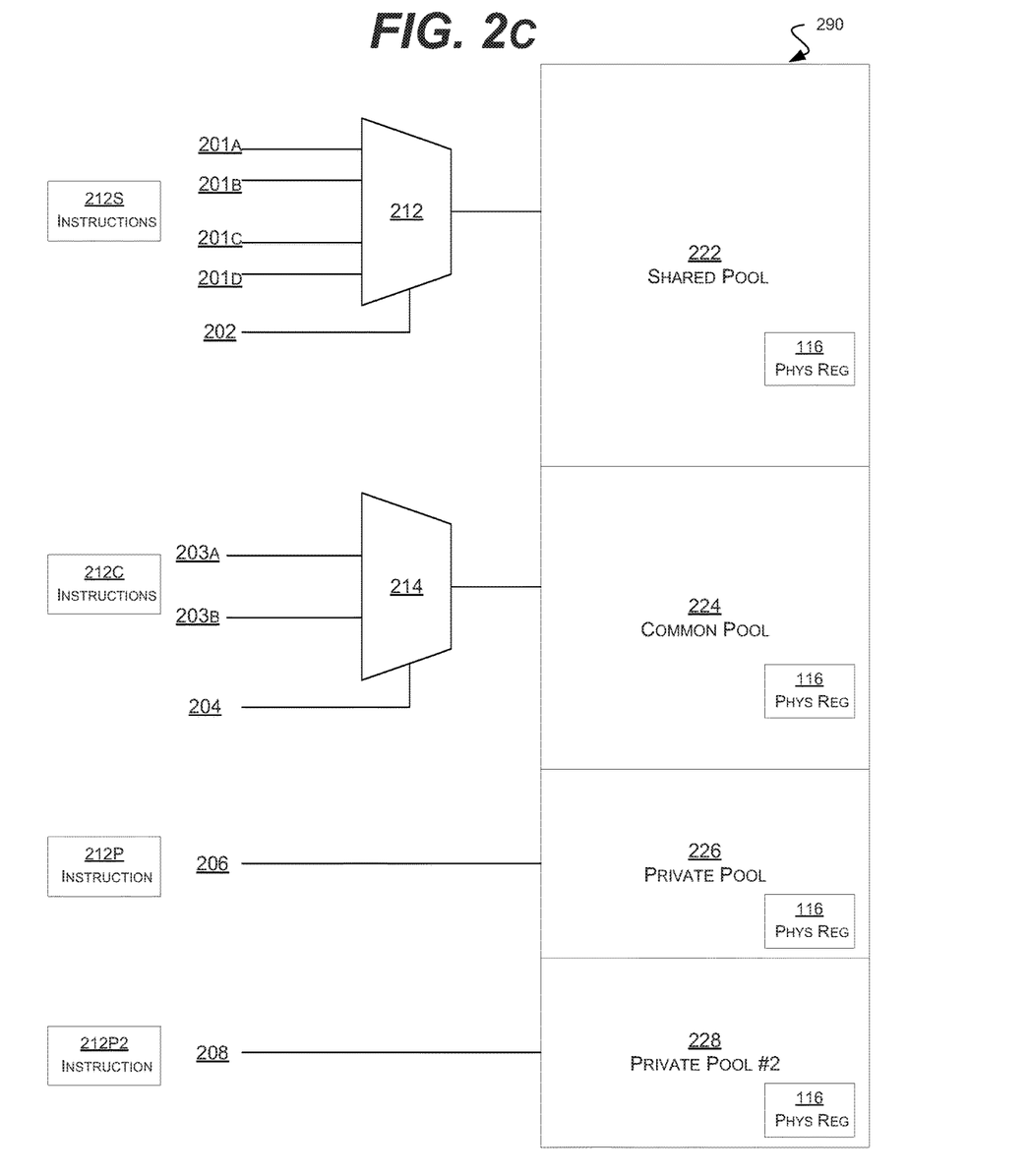
FIG. 2C is a block diagram of an example embodiment of an apparatus in accordance with the disclosed subject matter.

FIG. 2C is a block diagram of an example embodiment of an apparatus 290 in accordance with the disclosed subject matter. In various embodiments, the apparatus 290 may include a register file or circuit, as described above. It is understood that the above is merely one illustrative example to which the disclosed subject matter is not limited.

In the illustrated embodiment, the apparatus or register file 290 may include a shared pool 222, a common pool 224, and a first private pool 226, each with respective physical registers 116, as described above. As described above, the shared pool 222 may be associated with the shared instructions 212S, the write ports 201A, 201B, 201C & 201D, and the selection circuit 212. The common pool 224 may be associated with the common instructions 212C, the write ports 203A & 203B, and the selection circuit 214. The first private pool 226 may be associated with a first private instruction 212P, and the write port 212P. As described above, in various embodiments, the shared pool 222 may be associated with more write ports than the common pool 224. The common pool 224 may be associated with more write ports than the private pool 226. It is understood that the above are merely a few illustrative examples to which the disclosed subject matter is not limited.

In the illustrated embodiment, the register file or apparatus 290 may also be partitioned or portioned into a second private pool 228. As described above, the second private pool 228 may include a number of physical registers 116. Unlike the shared pool 222 and common pool 224, which are associated with multiple instructions (e.g., instructions 212S and 212C), the second private pool 228 may be associated with a single instruction 212P2. In the illustrated embodiment, this second private instruction 212P2 may be different than the first private instruction 212P.

In such an embodiment, the second private pool 228 may be associated with or include an even smaller number of write ports than the common pool 224. However, both private pools 226 and 228 may include the same number of respective write ports (e.g., one each). In the illustrated embodiment, the second private pool 228 may include a single write port 208. In such an embodiment, the write port logic may be very simplified (consuming less power and area, for example).

In the illustrated embodiment, if the scheduler or execution unit is not able to rename the architectural register to the second private pool (despite the architectural register being associated with the private instruction 212P2), it may rename it to the common pool 224 or the shared pool 222 (assuming the private instruction 212P is included in the common instructions 212C). If the private instruction 212P is not included in the common instructions 212C, the scheduler or execution unit may rename the architectural register to the shared pool 222 instead. In such an embodiment, the scheduler or execution unit may not write to the first private pool 226, as the first private instruction 212P is not the same as the second private instruction 212P2. It is understood that the above are merely a few illustrative examples to which the disclosed subject matter is not limited.

In one specific embodiment, the register file 290 may include 140 physical registers 116. In such an embodiment, the shared pool 22 may include 60 physical registers 116. The common pool may include 40 physical registers 116. The first private pool 226 may include 20 physical registers 116. And, the second private pool 226 may include 20 physical registers 116. In one embodiment, the common instructions 212C may include the ADD and LOAD instructions. The first private instruction 212P may include the ADD instruction. The second private instruction 212P2 may include the LOAD instruction. It is understood that the above is merely one illustrative example to which the disclosed subject matter is not limited.

In another embodiment, the register file may include multiple common pools, each with their own respective common instructions 212C. In yet another embodiment, the private instructions 212P and 212P2 may be statically or dynamically configured or determined. As described above, in various embodiments, the private instructions 212P and 212P2 may be changed based upon which instructions are in demand at any given time. In such an embodiment, this dynamic re-configurability may increase the complexity of the write port logic, and may not be desirable.

Figure 3:
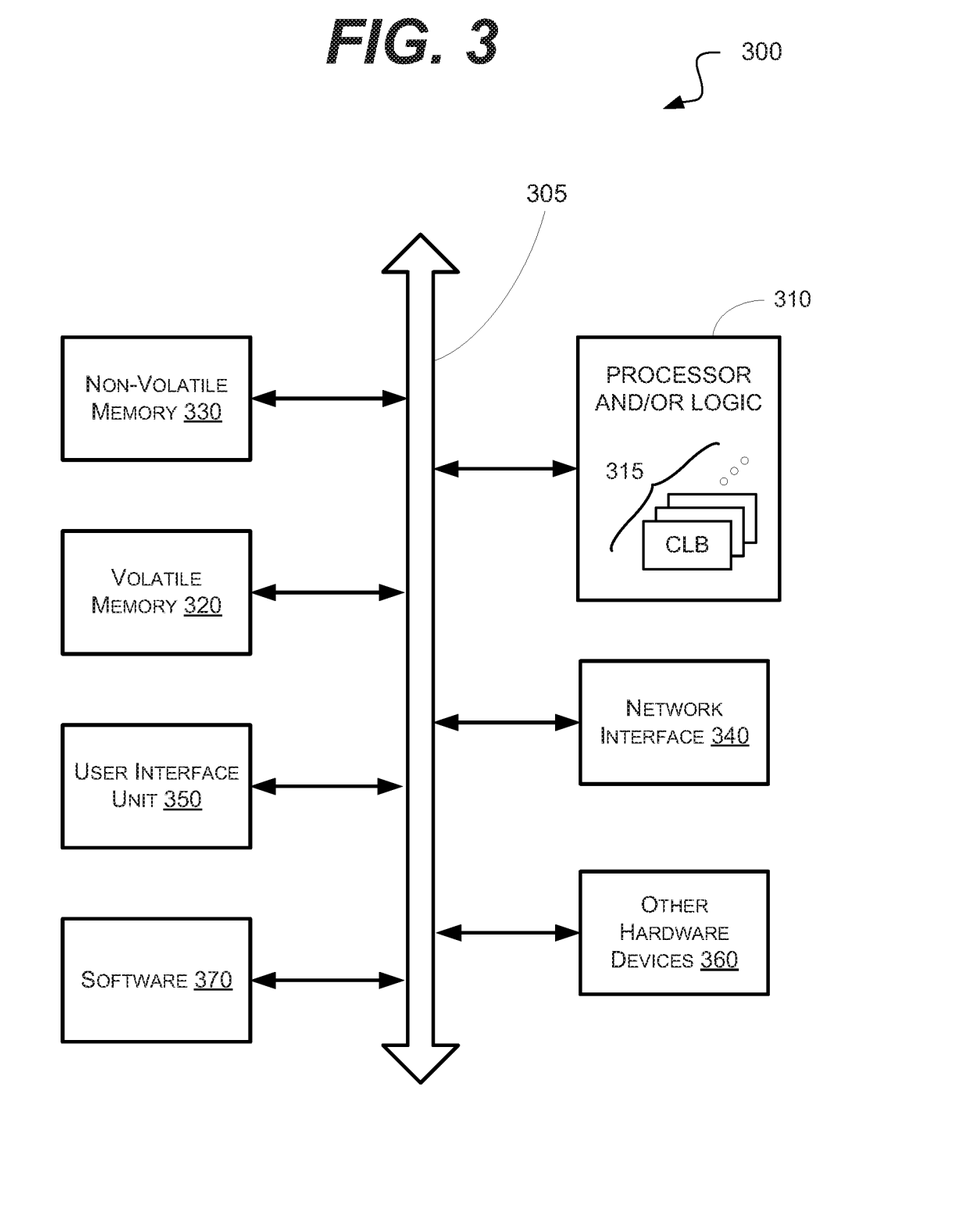
FIG. 3 is a schematic block diagram of an information processing system that may include devices formed according to principles of the disclosed subject matter.

FIG. 3 is a schematic block diagram of an information processing system 300, which may include semiconductor devices formed according to principles of the disclosed subject matter.

Referring to FIG. 3, an information processing system 300 may include one or more of devices constructed according to the principles of the disclosed subject matter. In another embodiment, the information processing system 300 may employ or execute one or more techniques according to the principles of the disclosed subject matter.

In various embodiments, the information processing system 300 may include a computing device, such as, for example, a laptop, desktop, workstation, server, blade server, personal digital assistant, smartphone, tablet, and other appropriate computers or a virtual machine or virtual computing device thereof. In various embodiments, the information processing system 300 may be used by a user (not shown).

The information processing system 300 according to the disclosed subject matter may further include a central processing unit (CPU), logic, or processor 310. In some embodiments, the processor 310 may include one or more functional unit blocks (FUBs) or combinational logic blocks (CLBs) 315. In such an embodiment, a combinational logic block may include various Boolean logic operations (e.g., NAND, NOR, NOT, XOR), stabilizing logic devices (e.g., flip-flops, latches), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 300 according to the disclosed subject matter may further include a volatile memory 320 (e.g., a Random Access Memory (RAM)). The information processing system 300 according to the disclosed subject matter may further include a non-volatile memory 330 (e.g., a hard drive, an optical memory, a NAND or Flash memory). In some embodiments, either the volatile memory 320, the non-volatile memory 330, or a combination or portions thereof may be referred to as a "storage medium". In various embodiments, the volatile memory 320 and/or the non-volatile memory 330 may be configured to store data in a semi-permanent or substantially permanent form.

In various embodiments, the information processing system 300 may include one or more network interfaces 340 configured to allow the information processing system 300 to be part of and communicate via a communications network. Examples of a Wi-Fi protocol may include, but are not limited to, Institute of Electrical and Electronics Engineers (IEEE) 802.11g, IEEE 802.11n. Examples of a cellular protocol may include, but are not limited to: IEEE 802.16m (a.k.a. Wireless-MAN (Metropolitan Area Network) Advanced, Long Term Evolution (LTE) Advanced, Enhanced Data rates for GSM (Global System for Mobile Communications) Evolution (EDGE), Evolved High-Speed Packet Access (HSPA+). Examples of a wired protocol may include, but are not limited to, IEEE 802.3 (a.k.a. Ethernet), Fibre Channel, Power Line communication (e.g., Home-Plug, IEEE 1901). It is understood that the above are merely a few illustrative examples to which the disclosed subject matter is not limited.

The information processing system 300 according to the disclosed subject matter may further include a user interface unit 350 (e.g., a display adapter, a haptic interface, a human interface device). In various embodiments, this user interface unit 350 may be configured to either receive input from a user and/or provide output to a user. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

In various embodiments, the information processing system 300 may include one or more other devices or hardware components 360 (e.g., a display or monitor, a keyboard, a mouse, a camera, a fingerprint reader, a video processor). It is understood that the above are merely a few illustrative examples to which the disclosed subject matter is not limited.

The information processing system 300 according to the disclosed subject matter may further include one or more system buses 305. In such an embodiment, the system bus 305 may be configured to communicatively couple the processor 310, the volatile memory 320, the non-volatile memory 330, the network interface 340, the user interface unit 350, and one or more hardware components 360. Data processed by the processor 310 or data inputted from outside of the non-volatile memory 330 may be stored in either the non-volatile memory 330 or the volatile memory 320.

In various embodiments, the information processing system 300 may include or execute one or more software components 370. In some embodiments, the software components 370 may include an operating system (OS) and/or an application. In some embodiments, the OS may be configured to provide one or more services to an application and manage or act as an intermediary between the application and the various hardware components (e.g., the processor 310, a network interface 340) of the information processing system 300. In such an embodiment, the information processing system 300 may include one or more native applications, which may be installed locally (e.g., within the non-volatile memory 330) and configured to be executed directly by the processor 310 and directly interact with the OS. In such an embodiment, the native applications may include pre-compiled machine executable code. In some embodiments, the native applications may include a script interpreter (e.g., C shell (csh), AppleScript, AutoHotkey) or a virtual execution machine (VM) (e.g., the Java Virtual Machine, the Microsoft Common Language Runtime) that are configured to translate source or object code into executable code which is then executed by the processor 310.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SSOP) technique, a thin small outline package (TSOP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the scope of these disclosed concepts. Therefore, it should be understood that the above embodiments are not limiting, but are illustrative only. Thus, the scope of the disclosed concepts are to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. An apparatus comprising:
 a register circuit comprising:
  a plurality of physical registers that are partitioned into at least a common portion that is reserved for a predefined plurality of instruction classes, and a shared portion that is available to any instruction class, and
  a plurality of write ports, wherein each portion is associated with at least one respective write port; and
 an instruction scheduler circuit configured to:
  rename an architectural register associated with an instruction to a physical register, wherein the portion including the physical register is selected based, at least in part, upon a characteristic of the instruction.

2. The apparatus of claim 1, wherein the instruction scheduler circuit is configured to only rename the architectural register to a physical register of the common portion if the instruction is one of the predefined plurality of instruction class.

3. The apparatus of claim 1, wherein the plurality of physical registers includes a private portion associated with a single instruction class.

4. The apparatus of claim 3, wherein the shared portion is associated with a first number of write ports,
 the common portion is associated with a second number of write ports, which is less than first number of write ports, and
 the private portion is associated with a third number of write ports, which is less than the second number of write ports.

5. The apparatus of claim 3, wherein the plurality of physical registers includes a plurality of private portions, each associated with a respective, single instruction class; and
 wherein each private portion is associated with a single write port.

6. The apparatus of claim 3, wherein the instruction scheduler circuit is configured to only rename the architectural register to a physical register of the private portion if the instruction is the single instruction class.

7. The apparatus of claim 6, wherein the instruction scheduler circuit is configured to, if the instruction is the single instruction class but the architectural register cannot be renamed to a physical register of the private portion:
 rename the architectural register to a physical register of the common portion if the instruction is one of the predefined plurality of instruction classes, or
 rename the architectural register to a physical register of the shared portion.

8. The apparatus of claim 1, wherein the predefined plurality of instruction classes may be statically set as part of a resetting of the apparatus.

9. The apparatus of claim 1, wherein the write ports associated with the shared portion consume less power than the write ports associated with the common portion.

10. A method comprising:
 determining an instruction; and
 renaming an architectural register associated with the instruction to a physical register within a register circuit, wherein the register circuit comprises:
  a plurality of physical registers that are partitioned into at least a common portion that is associated with a predefined plurality of instruction classes, and a shared portion; and
 wherein renaming comprises a selected portion of the register circuit based upon the instruction class, and selecting a physical register include within the selected portion.

11. The method of claim 10, wherein the register circuit comprises a plurality of write ports, wherein each portion is associated with at least one respective write port.

12. The method of claim 10, wherein the renaming comprises only renaming the architectural register to a physical register of the common portion if the instruction is one of the predefined plurality of instruction classes.

13. The method of claim 10, wherein the plurality of physical registers includes a private portion associated with a single instruction class.

14. The method of claim 13, wherein the shared portion is associated with a first number of write ports,
 the common portion is associated with a second number of write ports, which is less than first number of write ports, and
 the private portion is associated with a third number of write ports, which is less than the second number of write ports.

15. The method of claim 13, wherein the plurality of physical registers includes a plurality of private portions, each associated with a respective, single instruction class; and
 wherein each private portion is associated with a single write port.

16. The method of claim 13, wherein renaming includes only renaming the architectural register to a physical register of the private portion if the instruction is of the single instruction class.

17. The method of claim 16, wherein renaming comprises, if the instruction is of the single instruction class but the architectural register cannot be renamed to a physical register of the private portion:
 renaming the architectural register to a physical register of the common portion if the instruction is one of the predefined plurality of instruction classes, or
 renaming the architectural register to a physical register of the shared portion.

18. The method of claim 11, wherein the write ports associated with the shared portion consume less power than the write ports associated with the common portion.

19. A system comprising:
 a register circuit comprising:
  a plurality of physical registers that are partitioned into at least a common portion that is associated with a predefined plurality of execution units, and a shared portion that is available to any execution unit,
  wherein writing to the common portion composes less power than writing to the shared portion; and
 an instruction decode circuit configured to:

determine an execution unit associated with an instruction, and rename an architectural register associated with the instruction to a physical register, wherein the portion including the physical register is selected based, at least in part, upon the execution unit.

20. The system of claim 19, wherein the plurality of physical registers includes a private portion associated with a single execution unit.

\* \* \* \* \*